United States Patent [19]

Wright, Jr. et al.

[11] 3,880,904

[45] Apr. 29, 1975

[54] HYDROCINNAMONITRILES

[75] Inventors: Donald Perry Wright, Jr., Pennington; Donald Frederic Barringer, Jr., Trenton; Donald Edward McKay, Highland Park, all of N.J.

[73] Assignee: American Cyanamid Company, Stamford, Conn.

[22] Filed: May 21, 1973

[21] Appl. No.: 362,617

Related U.S. Application Data

[60] Division of Ser. No. 250,338, May 4, 1972, Pat. No. 3,793,456, and a continuation-in-part of Ser. No. 141,444, May 7, 1971, abandoned.

[52] U.S. Cl.... 260/465 E; 260/332.3 R; 260/347.7; 424/275; 424/285; 424/304
[51] Int. Cl............................................ C07c 121/78
[58] Field of Search ................................. 260/465 E

[56] References Cited
UNITED STATES PATENTS
3,641,098   2/1972   Buchel et al....................... 260/465

Primary Examiner—Lewis Gotts
Assistant Examiner—Dolph H. Torrence
Attorney, Agent, or Firm—Harry H. Kline

[57] ABSTRACT

The present invention relates to insecticidal methods and compositions employing $\alpha$, $\beta$-dioxohydrocinnamonitriles having the formula:

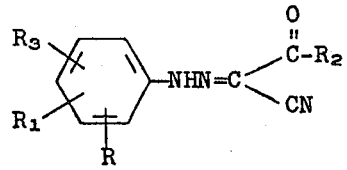

where R, $R_1$, $R_2$ and $R_3$ are defined as follows: R is halo, loweralkyl ($C_1$–$C_4$), loweralkoxy ($C_1$–$C_4$), cyano, nitro, trifluoromethyl, phenylazo or p-chlorophenoxy; $R_1$ is hydrogen, halo, trifluoromethyl or loweralkyl ($C_1$–$C_4$); $R_3$ is hydrogen or halo; and $R_2$ is phenyl, halophenyl, dihalophenyl, alkyl ($C_1$–$C_4$) phenyl, loweralkoxy ($C_1$–$C_4$) phenyl, 1-naphthyl, 2-furyl, or 2-thienyl.

5 Claims, No Drawings

HYDROCINNAMONITRILES

This is a division of application Ser. No. 250,338, filed May 4, 1972, now U.S. Pat. No. 3,793,456, issued on Feb. 19, 1974, and a continuation-in-part of application Ser. No. 141,444, filed May 7, 1971, now abandoned.

The present invention relates to the use of certain hydrazones in insecticidal methods and compositions. It further relates to certain novel hydrazones used therein and to the preparation thereof.

More particularly, the invention relates to insecticidal methods and compositions employing hydrazones of $\alpha, \beta$-dioxohydrocinnamonitriles having the formula:

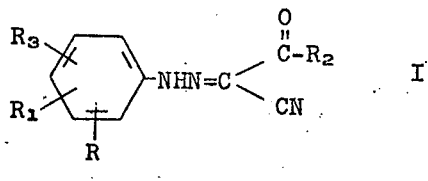

where R, $R_1$, $R_2$ and $R_3$ are defined as follows: R is halo, loweralkyl ($C_1$–$C_4$), loweralkoxy ($C_1$–$C_4$), cyano, nitro, trifluoromethyl, phenylazo or p-chlorophenoxy; $R_1$ is hydrogen, halo, trifluoromethyl or loweralkyl ($C_1$–$C_4$); $R_3$ is hydrogen or halo; and $R_2$ is phenyl, halophenyl, dihalophenyl, alkyl ($C_1$–$C_4$) phenyl, loweralkoxy ($C_1$–$C_4$) phenyl, 1-naphthyl, 2-furyl, or 2-thienyl. It further relates to the novel hydrazone compounds thereof having unexpectedly high insecticidal activity, having the formula:

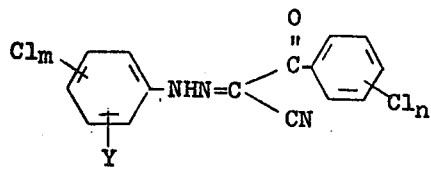

wherein Y is hydrogen, chloro or loweralkyl ($C_1$–$C_4$); n is 0, 1 or 2; and m is 1 or 2. Especially preferred compounds therein are: $\alpha,\beta$-dioxo-, $\alpha$-[(3-chloro-o-tolyl)hydrazone]hydrocinnamonitrile, $\alpha,\beta$-dioxo-, $\alpha$-[-(3,4-dichlorophenyl)hydrazone]hydrocinnamonitrile, $\alpha,\beta$-dioxo-, $\alpha$-[(2,4-dichlorophenyl)hydrazone]hydrocinnamonitrile, p-chloro-$\alpha,\beta$-dioxo, $\alpha$-[(p-chlorophenyl)hydrazone]hydrocinnamonitrile and $\alpha,\beta$-dioxo-, $\alpha$-[(2,4,5-trichlorophenyl)hydrazone]hydrocinnamonitrile. Finally, it relates to the preparation of the above novel hydrazone compounds.

Illustrative hydrazones include: hydrocinnamonitrile, $\alpha,\beta$-dioxo-, $\alpha$-[(2,5-dichlorophenyl)hydrazone]; hydrocinnamonitrile, $\alpha,\beta$-dioxo-, $\alpha$-[(p-chlorophenyl)hydrazone]; hydrocinnamonitrile, $\alpha,\beta$-dioxo-, $\alpha$-[(p-phenylazophenyl)hydrazone]; hydrocinnamonitrile, $\alpha,\beta$-dioxo-, $\alpha$-[(3,4-dichlorophenyl)hydrazone]; hydrocinnamonitrile, $\alpha,\beta$-dioxo-, $\alpha$-1-naphthylhydrazone]; hydrocinnamonitrile, $\alpha,\beta$-dioxo-, $\alpha$-[(m-chlorophenyl)hydrazone]; hydrocinnamonitrile, $\alpha,\beta$-dioxo-, $\alpha$-[(o-chlorophenyl)hydrazone]; hydrocinnamonitrile, $\alpha,\beta$-dioxo-, $\alpha$-[(4-chloro-o-tolyl)hydrazone]; hydrocinnamonitrile, $\alpha,\beta$-dioxo-, $\alpha$-[(2,5-dichlorophenyl)hydrazone]; hydrocinnamonitrile, p-chloro-$\alpha,\beta$-dioxo-, $\alpha$-[(p-chlorophenyl)hydrazone]; hydrocinnamonitrile, $\alpha,\beta$-dioxo-, $\alpha$-(p-tolylhydrazone); 2-furanpropionitrile, $\alpha,\beta$-dioxo-, $\alpha$-[(p-chlorophenyl)hydrazone]; 2-thiophenepropionitrile, $\alpha,\beta$-dioxo-, $\alpha$-[(p-chlorophenyl)hydrazone]; 1-naphthalenepropionitrile, $\alpha,\beta$-dioxo-, $\alpha$-[(p-chlorophenyl)-hydrazone]; acetanilide, 4'-[($\alpha$-cyanophenacylidene)hydrazino]-N-methyl-; $\alpha,\beta$-dioxohydrocinnamonitrile $\alpha$-($\alpha,\alpha,\alpha,\alpha',\alpha',\alpha'$-hexafluoro-3,5-xylyl)hydrazone; butyronitrile, 2,3-dioxo-, 2-[(p-chlorophenyl)hydrazone]; hydrocinnamonitrile, $\alpha,\beta$-dioxo-, $\alpha$-[(3-chloro-2-methylphenyl)hydrazone]; hydrocinnamonitrile, $\alpha,\beta$-dioxo-, $\alpha$-[(2,4,5-trichlorophenyl)hydrazone]; hydrocinnamonitrile, $\alpha,\beta$-dioxo-, $\alpha$-[(p-bromophenyl)hydrazone]; hydrocinnamonitrile, $\alpha,\beta$-dioxo-, $\alpha$-[(4-fluoro- 3-methylphenyl)hydrazone]; hydrocinnamonitrile, $\alpha,\beta$-dioxo-, $\alpha$-[(2,4,6-tribromomethyl)hydrazone]; hydrocinnamonitrile, m-chloro-$\alpha,\beta$-dioxo-, $\alpha$-[(2,5-dichlorophenyl)-hydrazone]; and the like.

The hydrazones are prepared by reacting an aniline of Formula II with a diazotizing agent in the presence of a mineral acid and further reacting the thus-formed diazonium salt with an aroylacetonitrile III. The synthetic method may be illustrated as follows:

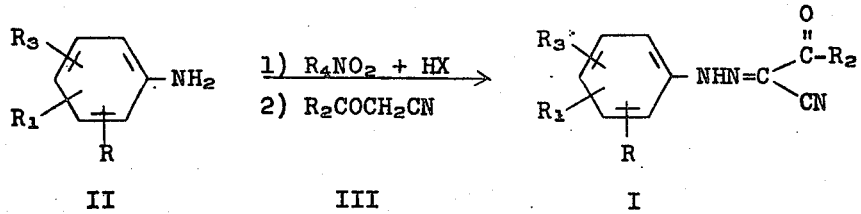

wherein $R_4$ is selected from the group consisting of an alkali metal, such as lithium, potassium or sodium and $C_1$–$C_4$ loweralkyl groups, such as methyl, ethyl, n-propyl, iso-propyl, n-butyl, t-butyl and the like and HX represents a mineral acid, such as HCl, $H_2SO_4$, $HNO_3$ and the like. R, $R_1$, $R_2$ and $R_3$ are as above.

The relative quantities of the ingredients employed can be widely varied. For optimum yields, it is generally preferred to react equimolar quantities of the aniline and nitrite. Lower alcohols $C_1$–$C_4$, water and mixtures thereof are among the preferred solvents for use in carrying out the synthesis. It is also preferred to employ a mineral acid in sufficient quantities to produce an acidic pH in the aqueous or alcoholic solvent and to adjust the reaction temperature to temperatures within the range of from about −10°C. to about +10°C. The preferred temperature is about 0°C.

Sodium and potassium nitrite and methyl, ethyl or n-butyl nitrite are among the preferred diazotizing agents which are particularly well suited for use in the syntheses.

Preferred mineral acids include sulfuric, hydrochloric and hydrobromic acid. It is generally preferred to employ a slight excess of the acid over and above the stoichiometric amount required to form the substituted benzene diazonium salt.

After formation of the desired diazonium salt, the reaction mixture is preferably reacted further by adding it to a mixture of the appropriate aroylacetonitrile and a weak base, such as sodium or potassium acetate while the temperature is maintained at from about −10°C. to about +10°C. The desired hydrazone of the α,β-dioxohydrocinnamonitrile is produced thereby and may be recovered from the reaction mixture by any convenient means, such as, by filtration, centrifugation and the like.

It has been found that the hydrazones of Formula I and especially the novel hydrazones α,β-dioxo-, α-[(3-chloro-o-tolyl)hydrazone] hydrocinnamonitrile and α,β-dioxo-, α-[(3,4-dichlorophenyl)hydrazone] hydrocinnamonitrile are useful as insecticides. They are particularly effective for controlling lepidoptera and mosquitoes, especially in the larval stages.

The insecticidal methods of the present invention involve contacting the insect to be controlled or the locus or area where insect control is desired with an insecticidally effective amount of one or more of said hydrazones. Application of the active ingredient at a rate of from between about 0.5 and about 15 pounds per acre of the active ingredient is generally sufficient to achieve the desired insect control.

For application of the hydrazones, it is generally preferred to employ them in combination with conventional pesticidal adjuvants and formulation aids. They may be advantageously employed with the use of either solid or liquid adjuvants and applied in the form of dusts, dust concentrates, wettable powders, emulsifiable concentrates and the like.

Field application of these formulations may be made by conventional equipment, such as power dusters, boom and hand sprayers, spray dusters, addition to irrigation water, and the like.

The active ingredient may be initially formulated with a concentrated composition, comprising the active ingredient in a solid or liquid adjuvant which serves as a formulation aid or conditioning agent, permitting the concentrates to be further mixed with a suitable solid or liquid carrier.

Useful liquid adjuvants in which the toxicant is dissolved, suspended or distributed include, for example, xylene, benzene, lower alcohols $C_1$–$C_4$, fuel oil or the like, with or without an emulsifying agent. For application, the resulting solution can be further diluted with either water or an organic diluent, such as deodorized kerosene. Concentrations in the range of from about 5 to about 95 percent are generally suitable for initial solution. When diluted for application, suitable solutions may contain the active ingredient in concentrations of from about 0.5 to about 5000 ppm.

Suitable solid adjuvants include, for example, attapulgite, kaolin, talc or diatomaceous earth in granular or finely ground form. The active ingredient can be conveniently formulated with the solid adjuvants as dusts, dust concentrates, wettable powders, granulars and the like.

Dusts are generally prepared by grinding together from about 1 to 10 percent by weight of the hydrazone with a finely divided inert diluent such as attapulgite, kaolin, diatomaceous earth, talc, or fuller's earth. These formulations can then be applied with dusting equipment to the foliage of agronomic crops or fields, meadows, forests or the like which are to be protected from insect attack or where insect control is desired. Application is generally sufficient to provide between about 0.5 and 15 pounds per acre of active material.

Dust concentrates are usually prepared in the same manner as dusts but generally from about 25 to 75 percent by weight of the active hydrazone and from 75 to 25 percent by weight of diluent are used.

Wettable powders are prepared in the same fashion as the dust concentrates, however, from about 1 to 5 percent by weight of an emulsifying agent and from about 1 to 5 percent by weight of a dispersing agent are usually included in such formulations. Polyethylene glycols, methoxy polyethylene glycols, sodium lignosulfonate, calcium dodecylbenzene sulfonate and the like are among the emulsifying agents and dispersing agents which can be used in these formulations. In practice, the wettable powders are generally dispersed in water and applied as a dilute spray to the vegetation or water where insect control is desired.

Usually, concentrations of the active ingredient of from about 10 to 1000 ppm dispersed in the water of ponds, lakes, creeks, swamps and such will give excellent control of mosquito larvae. Excellent insect control and plant protection in fields, forests, crop lands and the like is generally achieved by application of the active ingredient at rates of from about 1 to about 15 pounds per acre.

The invention is further illustrated by the following examples which are not to be taken as limitative thereof. In each case, the parts and percentages are by weight unless otherwise indicated.

EXAMPLE 1

Preparation of α,β-dioxohydrocinnamonitrile α-(α,α,α,α',α',α'-hexafluoro-3,5-xylyl)hydrazone

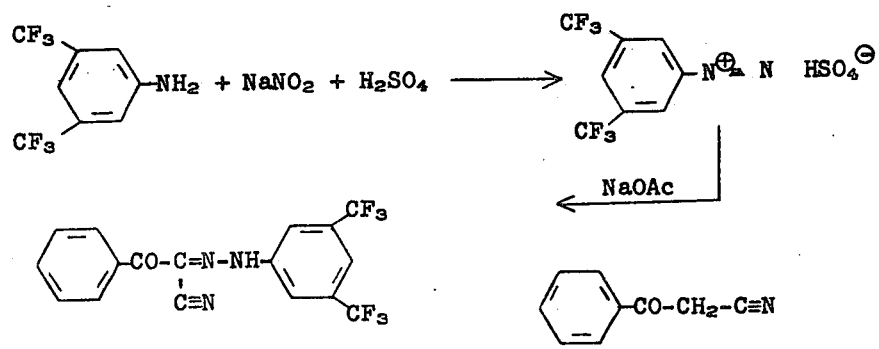

The α,α,α,α',α',α'-hexafluoro-3,5-xylidine (5.72 g., 0.0250 mole) was added to 25 ml. of a stirred, ice-cold 6N-sulfuric acid solution. The hydrosulfate salt precipitated as a flocculent white solid. This mixture was stirred and maintained in an ice bath while a solution of the sodium nitrite (1.72 g., 0.0250 mole) in a little water was added dropwise. The yellow diazonium salt solution was then filtered to remove a small amount of precipitate. The β-oxohydrocinnamonitrile (3.62 g., 0.0250 mole) was slurried in 25 ml. of 2B ethanol, and a solution of sodium acetate (12.30 g., 0.150 mole) in 40 ml. of water was added. This mixture was stirred and maintained in an ice bath while the diazonium salt solution was added dropwise. Thereafter, the solution was stirred with cooling for an additional hour and the desired product produced as a solid precipitate was recovered by filtration. It was washed with water, and air dried to yield 8.07 g. (84 percent yield) in the form of a yellow-orange solid having an m.p. of 185°–191°C. The product was purified and recrystallized from ethanol with a little added water to yield 5.93 g. (62 percent) of a yellow-orange solid having an m.p. of 191.0°–193.5°C. Identification was by infrared spectrum and the following elemental analysis:

Calcd. for $C_{17}H_9F_6N_3O$: C, 53.00; H, 2.35; F, 29.59; N, 10.91. Found: C, 52.77; H, 2.33; F, 30.55; N, 10.92.

EXAMPLES 2–16

Preparation of various α,β-dioxohydrocinnamonitrile hydrazones

A variety of α,β-dioxohydrocinnamonitrile hydrazones of Formula I were prepared by the general procedure of Example 1, employing the appropriately substituted aniline and cinnamonitrile, in lieu of the α,α,α,α',α',α'-hexafluoro-3,5-xylidene and β-oxohydrocinnamonitrile used therein, to produce the hydrazones set forth in Table I below. $R_3$, which is shown in Table I, is in each case H.

EXAMPLE 17

Preparation of α,β-dioxo-α-[(p-chlorophenyl)hydrazone]-hydrocinnamonitrile

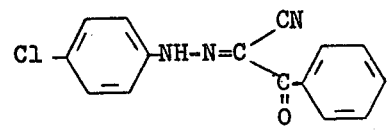

A solution of p-chloroaniline (2.5 g., 0.02 mole) in 30 ml. of 10 percent aqueous hydrochloric acid was cooled to −5°C., and a solution of sodium nitrite (1.5 g., 0.02 mole) in 5 ml. of water was added dropwise. The resulting solution was stirred for one-half hour. Excess nitrous acid was destroyed by addition of sulfamic acid, and the resulting solution was filtered. The filtrate was added dropwise over a period of 15 minutes to a mixture of benzoylacetonitrile (2.9 g., 0.02 mole) in 30 ml. of methanol, 10 ml. of water, and 15 g. of solid sodium acetate at 0°C. The resulting mixture was stirred overnight. The desired product was isolated by filtration, washed with water, and dried in vacuo at 80°C., yielding 5.0 g. (88 percent).

Purification was effected by successive recrystallizations from aqueous ethanol to give a product having an m.p. of 175°–175.5°C.

EXAMPLE 18

Preparation of α,β-dioxo-, α-[(3-chloro-o-tolyl)hydrazone]hydrocinnamonitrile

TABLE I

| Example number | R | $R_1$ | $R_2$ | Percent Yield | Melting point (° C.) | Calculated C | H | N | Cl | Found C | H | N | Cl |
|---|---|---|---|---|---|---|---|---|---|---|---|---|---|
| 2 | | Benzo | Phenyl | 43 | 145.5–146.0 | 76.24 | 4.38 | 14.04 | | 76.53 | 4.44 | 14.11 | |
| 3 | m-Cl | H | do | 87.5 | 165–165.5 | 63.50 | 3.55 | 14.81 | 12.50 | 63.70 | 3.75 | 14.72 | 12.50 |
| 4 | o-Cl | H | do | 92 | 126.5–127.5 | 63.50 | 3.55 | 14.81 | 12.50 | 63.41 | 3.58 | 14.78 | 12.48 |
| 5 | p-Cl | o-CH₃ | do | 89 | 156.5–157 | 64.54 | 4.06 | 14.11 | 11.91 | 64.75 | 4.15 | 14.17 | 11.97 |
| 6 | 2-Cl | 5-Cl | do | 88 | 127–127.5 | 56.62 | 2.85 | 13.20 | 22.29 | 55.68 | 3.40 | 12.23 | 20.73 |
| 7 | p-Cl | H | p-Chlorophenyl | 50 | 226–228.1 | 56.62 | 2.85 | 13.20 | 22.29 | 56.61 | 2.90 | 13.18 | 22.41 |
| 8 | | | Phenyl | 55 | ¹250–251 | 67.48 | 5.08 | 17.49 | | 67.30 | 4.97 | 17.52 | |
| 9 | $CH_3-\overset{O}{\overset{\|}{C}}-\overset{\|}{N}-CH_3$ | | | | | | | | | | | | |
| 9 | p-Cl | H | 2-furyl | 83 | 172.5–173 | 57.05 | 2.95 | 15.36 | 12.95 | 57.06 | 2.96 | 15.39 | 13.09 |
| 10 | p-Cl | H | 2-thienyl | 86 | 220–220.5 | 53.89 | 2.78 | 14.50 | 12.24 | 55.41 | 2.96 | 14.89 | 12.46 |
| 11 | p-Cl | H | 1-napthyl | 54 | 174–175 | 68.37 | 3.68 | 12.59 | 10.62 | 69.14 | 3.70 | 12.48 | 10.69 |
| 12 | 3-NO₂ | o-CH₃ | Phenyl | | | | | | | | | | |
| 13 | p-Cl | H | do | 88 | 175–175.5 | 63.48 | 3.56 | 14.82 | 12.50 | 63.41 | 3.67 | 14.89 | 13.06 |
| 14 | p-OCH₃ | o-NO₂ | do | 96 | 182–183 | 59.26 | 3.73 | 17.28 | | 59.01 | 3.83 | 17.54 | |
| 15 | Phenylazo | H | do | 83 | 179–180 | 71.37 | 4.28 | 19.82 | | 71.06 | 4.08 | 19.66 | |
| 16 | 2-OCH₃ | 5-Cl | do | 84 | 191–193 | 61.25 | 3.85 | 13.39 | 11.30 | 61.16 | 3.72 | 12.94 | 11.26 |

¹ Dec.

Step 1

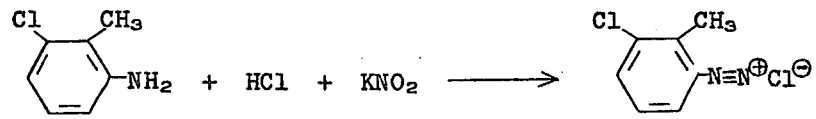

141.6     36.5     85.1     189.1

Step 2

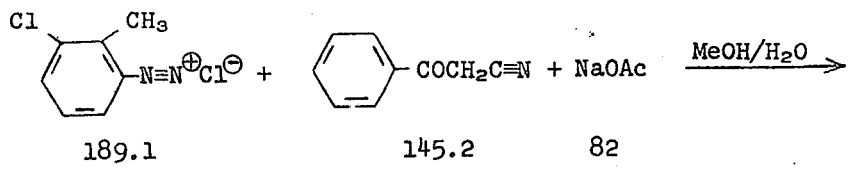

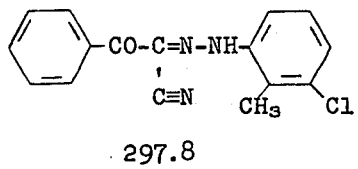

5.66 grams (0.04 m.) of 3-chloro-o-toluidine was dissolved in 60 ml. of 3N HCl (0.186 m.), and the solution was cooled to 0°C. 3.6 grams (0.04 m.) of potassium nitrite, which was dissolved in 10 ml. of water, was then added dropwise, maintaining the temperature at 0°C. The diazonium salt solution was then added to a solution of 5.81 grams (0.04 m.) of benzoylacetonitrile and 30 grams (0.365 m.) of sodium acetate dissolved in 300 ml. of water and 200 ml. of methanol, over approximately 5 minutes with rapid stirring at room temperature. The mixture was stirred for 1 hour at room temperature, and the bright yellow solids were collected by filtration. The crude product was recrystallized from 300 ml. of ethanol to 50 ml. of methyl ethyl ketone, water was added at reflux until the cloud point was reached (approximately 50 ml. necessary). 9.45 grams (80 percent theory) of yellow needles were obtained. Melting point is 133° to 133.5°C.

Analysis. Calculated for $N_3OClC_{16}H_{12}$: C, 64.56; H, 4.03; N, 14.12. Found: C, 64.16; H, 4.00; N, 14.08.

As in the case of the preparation of α,β-dioxo-, α-[(3-chloro-o-tolyl)hydrazone] hydrocinnamonitrile, the other novel hydrocinnamonitrile insecticides mentioned above, e.g., α,β-dioxo-, α-[(3,4-dichlorophenyl)hydrazone] hydrocinnamonitrile, can also be prepared by reacting the appropriately substituted aniline at a temperature of from about −10°C. to about +10°C. with a compound of the formula $R_4NO_2$, in a solvent rendered acidic by the addition of a mineral acid to form a diazonium salt solution of said aniline, and reacting the diazonium salt in solution to form said hydrazone by adding said diazonium salt to a mixture of a weak base and an aroylacetonitrile, e.g., $$C_6H_5COCH_2-C \equiv N$$

wherein $R_4$ is a member selected from the group consisting of alkali metals and $C_1$-$C_4$ loweralkyl groups.

EXAMPLE 19

Preparation of various α,β-dioxohydrocinnamonitrile hydrazones

A variety of α,β-dioxohydrocinnamonitrile hydrazones of Formula I were prepared by the general procedure of Example 1, employing the appropriately substituted aniline and cinnamonitrile. The compounds produced are set forth in Table II below.

TABLE II

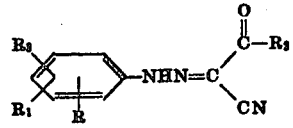

| R | $R_1$ | $R_2$ | $R_3$ | Melting point, °C. |
|---|---|---|---|---|
| 2-Cl | 3-Cl | H | Phenyl | 153-154 |
| 2-Cl | 4-Cl | H | do | 162-163 |
| 2-Cl | 6-Cl | H | do | 153-155 |
| 2-Cl | 4-Cl | H | do | 153-163 |
| 3-Cl | 4-Cl | H | do | 204-205 |
| 3-Cl | 5-Cl | H | do | 150-152 |
| 4-Br | H | H | do | 244-245 |
| 4-CN | H | H | do | 157-158 |
| 4-CH₃ | H | H | do | 115-116 |
| 4-n-C₄H₉ | H | H | do | 128-130 |
| 2-CH₃ | 5-t-C₄H₉ | H | do | 119-120 |
| 2-CH₃ | 5-Cl | H | do | 151-154 |
| 3-CH₃ | 4-F | H | do | 179-180 |
| 3-Cl | 4-CH₃ | H | do | 214-216 |
| 4-Cl | H | H | 3-chlorophenyl | 175-177 |
| 2-Cl | 4-Cl | H | 4-chlorophenyl | 221-222 |
| 3-Cl | 4-Cl | H | do | 138-140 |
| 2-Cl | 5-Cl | H | 3-chlorophenyl | 195-198 |
| 3-Cl | 4-Cl | H | do | 154-155 |
| 2-CH₃ | 3-Cl | H | do | 201-203 |
| 3-Cl | 4-Cl | H | 2,4-dichlorophenyl | 185-163 |
| 4-OCH₃ | H | H | 4-chlorophenyl | 250-251 |
| 4-NO₂ | H | H | do | 176-178 |
| 3-NO₂ | H | H | do | 172-174 |
| 4-Cl | H | H | 4-t-butylphenyl | 177-178 |
| 3-Cl | 4-Cl | H | do | 181-182 |
| 4-Cl | H | H | 4-methoxyphenyl | 191-192 |
| 3-Cl | 4-Cl | H | do | 125-134 |
| 2-Cl | 4-Cl | 6-Cl | Phenyl | 148.5-151 |
| 2-Cl | 4-Cl | 5-Cl | do | 191-193.5 |
| 3-CF₃ | 5-CF₃ | H | do | |
| 4-ClC₆H₅O | H | H | do | |

EXAMPLES 20-33

The insecticidal activity of the compounds of Formula I is demonstrated by the following tests using the test procedures set forth below.

Southern Armyworm (*Pradenia eridania* Cram.)

Compounds to be tested are made up as 0.1 percent solutions in 65/35 acetone-water mixtures. Sieva lima bean leaves are then dipped in the selected test solution and set in a hood to dry. When dry, they are placed in petri dishes lined on the bottom with a moist filter paper and ten third-instar armyworms are added to each dish. The dishes are covered, held at 80°F., 60 percent relative humidity for 2 days and then examined and mortality counts made. Untreated leaves are used as controls.

Tobacco Budworm (*Heliothis vireseus*)

Compounds to be tested are made up as 0.1 percent solutions in 65/35 acetone-water mixtures. Small leaves from cotton plants are then dipped in the selected test solutions and air dried. After drying, they are placed in a small medicine cup with a dental wick saturated with water and one third-instar tobacco budworm and held in a constant temperature and humidity room for 3 days. At the end of the holding period all cups are examined and mortality counts made. At least 10 replicates per test solution are used.

The data obtained are in each case set forth in Table III below. $R_3$, which is unshown in Table III, is in each case H.

EXAMPLES 34-42

The larvicidal activity of the compounds of Formula I is demonstrated in the following tests using mosquito larvae. The test procedure is as follows:

Mosquito Larvae (*Anopheles quadrimaculatus* Say)

Groups of 25 larvae of the common malaria mosquito are transferred with a medicine dropper to a 50 ml. beaker containing 25 ml. of water. The test compound is formulated as an emulsion containing 0.1 gram of test material, 0.2 gram of Alrodyne 315 emulsifier, a nonionic polymeric emulsifier by Alrose Chemical Company, 10 ml. of acetone and 90 ml. of water. This 1000 ppm emulsion is diluted ten-fold with 65 percent acetone-35 percent water to give 100 ppm. One milliliter of the 100 ppm emulsion is pipetted into 225 ml. of water in a 400 ml. beaker and stirred vigorously. The larvae in 25 ml. of water are added, giving a concentration of 0.4 ppm. Mortality counts are made after 24 hours at 80°F. Data obtained are provided below in Table IV. $R_3$, which is unshown in Table IV below, is in each case H.

TABLE IV

| Ex. No. | R | $R_1$ | $R_2$ | % Kill, Mosquito Larvae, Concentration 0.4% |
|---|---|---|---|---|
| 34 | m—Cl | H | phenyl | 92 |
| 35 | 2—Cl | 5—Cl | phenyl | 60 |
| 36 | 2—CH$_3$ | 4—Cl | phenyl | 100 |
| 37 | 2—CH$_3$ | 5—NO$_2$ | phenyl | 76 |
| 38 | Benzo | | phenyl | 100 |
| 39 | p—Cl | H | p-chlorophenyl | 100 |
| 40 | p—Cl | H | thienyl | 100 |
| 41 | p—Cl | H | naphthyl | 100 |
| 42 | p—Cl | H | CH$_3$ | 96 |

EXAMPLE 43

Foliar Residual Activity of Phenylhydrazones

The foliar residual activity of the phenylhydrazones and commercial standards is shown in Tables V, VI, VII

TABLE III

| Ex. No. | R | $R_1$ | $R_2$ | % Control Southern Armyworm, Concentration 0.1% | Tobacco Budworm, Concentration 0.1% |
|---|---|---|---|---|---|
| 20 | p—Cl | H | phenyl | 100 | 90 |
| 21 | m—Cl | H | phenyl | 100 | 80 |
| 22 | 2—Cl | 5—Cl | phenyl | 100 | 90 |
| 23 | p—Cl | o—CH$_3$ | phenyl | 100 | 90 |
| 24 | p—CH$_3$ | H | phenyl | 90 | 60 |
| 25 | o—CH$_3$ | 5—NO$_2$ | phenyl | 95 | 60 |
| 26 | Benzo | | phenyl | 50 | 60 |
| 27 | p—Cl | H | p-chlorophenyl | 100 | 100 |
| 28 | p—Cl | H | furyl | 100 | 60 |
| 29 | p—Cl | H | thienyl | 100 | 80 |
| 30 | p—Cl | H | naphthyl | 100 | 90 |
| 31 | 3—CF$_3$ | 5—CF$_3$ | phenyl | 100 | 100 |
| 32 | p—Cl | H | CH$_3$ | 100 | 100 |
| 33 | p-phenylazo | H | phenyl | 100 | 100 | and VIII. The rates in all the tables are expressed in pounds of actual ingredient per acre. All materials formulated as wettable powders (WP) and emulsifiable concentrates (EC) were applied in 86 gallons of water per acre. Application was made by a single flat-top nozzle moving on an overhead track. Materials formulated in 64.5 percent acetone, 35 percent water, and 0.5 percent Alrodyne 315, a polyethylene glycol fatty ester nonionic surfactant by Geigy Chemical Corporation were applied in the formulation vehicle at an equivalent of 86 gallons per acre. Following application, the treated plants are placed on greenhouse benches and permitted to dry. At various time intervals thereafter, treated leaves are removed from the plants, placed in petri dishes with moist filter papers on the bottoms thereof and containing 5 or 10 southern armyworms or gypsy moth larvae. Mortality counts are made after 3 days of exposure.

For bioassays with tobacco budworms, the excised leaves are cut into five sections, and each section is placed in a 1 ounce plastic medicine cup containing a 1 inch dental wick saturated with water, and one-third Instar tobacco budworm. Mortality counts are made after 3 days of exposure.

TABLE V
Foliar residual activity of phenylhydrazones on lima bean plants bioassayed with southern armyworms

| Formulation | Structure | Rate, pounds per acre | Age of residue on plants in weeks | | | |
|---|---|---|---|---|---|---|
| | | | 0 | 2 | 3 | 4 |
| | | | Percent mortality | | | |
| 50% WP | Ph-CO-C(CN)=N-NH-C6H4-Cl | ½ | 100 | 100 | 100 | 93 |
| | | 1 | 100 | 100 | 100 | 100 |
| 50% WP | Ph-CO-C(CN)=N-NH-C6H3-Cl2 | ½ | 100 | 93 | 100 | 90 |
| | | 1 | 100 | 100 | 100 | 100 |
| 50% WP | Cl-C6H4-CO-C(CN)=N-NH-C6H4-Cl | ½ | 100 | 100 | 95 | 90 |
| | | 1 | 100 | 100 | 100 | 100 |
| 50% WP—Check | | | 0 | 0 | 0 | 0 |
| 50% WP | Ph-CO-C(CN)=N-NH-C6H4-Cl | ½ | 60 | 20 | — | — |
| | | 1 | 80 | 60 | 20 | — |
| 50% WP | Ph-CO-C(CN)=N-NH-C6H3-Cl2 | ½ | 80 | 40 | — | — |
| | | 1 | 90 | 20 | — | — |
| 50% WP | Cl-C6H4-CO-C(CN)=N-NH-C6H4-Cl | ½ | 80 | 60 | 60 | 60 |
| | | 1 | 100 | 80 | 60 | 80 |
| 50% WP—Check | | | 20 | 40 | 0 | 50 |

TABLE VI
Foliar residual activity of phenylhydrazones on lima bean plants bioassayed with southern armyworms

| Formulation | Structure | Rate, pounds per acre | Age of residue on plants in weeks | | | |
|---|---|---|---|---|---|---|
| | | | 0 | 1 | 2 | 3 |
| | | | Percent mortality | | | |
| 64.5% A, 35% W, 0.5% Alrodyne 315 | Ph-CO-C(CN)=N-NH-C6H3(CH3)(Cl) | ½ | 100 | 73 | 63 | 78 |
| | | 1 | 100 | 68 | 25 | — |
| Do | Ph-CO-C(CN)=N-NH-C6H3Cl2 | ½ | 100 | 83 | 78 | 83 |
| | | 1 | 100 | 100 | 100 | 65 |
| Do | Cl-C6H4-CO-C(CN)=N-NH-C6H3Cl2 | ½ | 100 | 60 | 13 | — |
| | | 1 | 100 | 100 | 78 | 100 |
| Do | Cl-C6H4-CO-C(CN)=N-NH-C6H4-Cl | ½ | 100 | 100 | 100 | 65 |
| | | 1 | 100 | 100 | 100 | 100 |

TABLE VI—Continued

| Formulation | Structure | Rate, pounds per acre | Age of residue on plants in weeks | | | |
|---|---|---|---|---|---|---|
| | | | 0 | 1 | 2 | 3 |
| | | | Percent mortality | | | |
| 50% WP | Cl-C₆H₄-CO-C(C≡N)=N-NH-C₆H₄-Cl | ½ | 100 | 100 | 100 | 95 |
| | | 1 | 100 | 100 | 100 | 95 |
| 50% WP—Check | | | 0 | 0 | 0 | 0 |
| 64.5% A, 35% W, 0.5% Airodyne 315 | C₆H₅-CO-C(C≡N)=N-NH-C₆H₃(CH₃)(Cl) | ½ | 90 | 60 | 50 | 0 |
| | | 1 | 100 | 100 | 70 | 40 |
| Do | C₆H₅-CO-C(C≡N)=N-NH-C₆H₃Cl₂ | ½ | 100 | 80 | 100 | 40 |
| | | 1 | 100 | 100 | 100 | 60 |
| Do | Cl-C₆H₄-CO-C(C≡N)=N-NH-C₆H₄-Cl | ½ | 80 | 40 | — | — |
| | | 1 | 90 | 60 | 10 | — |
| Do | Cl-C₆H₄-CO-C(C≡N)=N-NH-C₆H₄-Cl | ½ | 20 | — | — | — |
| | | 1 | 90 | 70 | 90 | 20 |
| 50% WP | Cl-C₆H₄-CO-C(C≡N)=N-NH-C₆H₄-Cl | ½ | 70 | 60 | 70 | 10 |
| | | 1 | 90 | 100 | 100 | 20 |
| 50% WP—Check | | | 0 | 20 | 10 | 0 |

NOTE.—A=Acetone; W=Water.

TABLE VII

Foliar residual activity of experimental insecticides and standard on lima bean, radish, and tobacco plants aged in the greenhouse and bioassayed with southern armyworms

| Formulation | Structure | Rate, pounds per acre | Age of residue on plants in weeks | | | | | | | | | | | | | | |
|---|---|---|---|---|---|---|---|---|---|---|---|---|---|---|---|---|---|
| | | | Lima bean plants | | | | | Radish plants | | | | | Tobacco plants | | | | |
| | | | 0 | 1 | 2 | 3 | 4[1] | 0 | 1 | 2 | 3 | 4[1] | 0 | 1 | 2 | 3 | 4[1] |
| | | | Percent mortality of southern armyworms after 3 days of exposure | | | | | | | | | | | | | | |
| 50% WP | C₆H₅-CO-C(C≡N)=N-NH-C₆H₃(CH₃)(Cl) | ½ | 50 | 63 | 30 | — | 100 | 70 | 100 | 65 | 95 | 100 | 100 | 95 | 80 | 100 |
| | | 1 | 100 | 85 | 98 | 88 | 80 | 100 | 100 | 100 | 100 | 100 | | | | |
| 50% WP | C₆H₅-CO-C(C≡N)=N-NH-C₆H₃Cl₂ | ½ | 100 | 63 | 65 | 33 | — | 100 | 90 | 100 | 80 | 85 | 100 | 100 | 100 | 75 | 93 |
| | | 1 | 100 | 95 | 100 | 60 | 73 | 100 | 100 | 95 | 100 | 100 | | | | |
| 50% WP | C₆H₅-CO-C(C≡N)=N-NH-C₆H₄-Cl | ½ | 100 | 100 | 85 | 65 | 90 | 100 | 100 | 100 | 100 | 95 | 100 | 100 | 100 | 95 | 85 |
| | | 1 | 100 | 100 | 95 | 83 | 60 | 100 | 100 | 100 | 100 | 100 | | | | |
| 50% WP | C₆H₅-CO-C(C≡N)=N-NH-C₆H₃Cl₂ | ½ | 100 | 95 | 75 | 65 | 90 | 100 | 100 | 100 | 100 | 95 | 100 | 100 | 100 | 95 | 93 |
| | | 1 | 100 | 100 | 100 | 95 | 90 | 100 | 100 | 100 | 100 | 100 | | | | |
| 50% WP | Cl-C₆H₄-CO-C(C≡N)=N-NH-C₆H₄-Cl | ½ | 100 | 83 | 63 | 48 | 60 | 100 | 100 | 100 | 95 | 85 | 100 | 100 | 100 | 100 | 100 |
| | | 1 | 100 | 100 | 100 | 95 | 95 | 100 | 100 | 100 | 100 | 100 | | | | |

[1] Southern armyworms small—had to use second instead of third.

TABLE VIII

Foliar residual activity of experimental insecticides and standards on cotton plants aged in the greenhouse and bioassayed with various insects

| Formulation | Structure | Rate, pounds per acre | Age of residue on plants in weeks | | | | | | | | | | | | | |
|---|---|---|---|---|---|---|---|---|---|---|---|---|---|---|---|---|
| | | | Tobacco budworm | | | | | Southern armyworm | | | | | Gypsy moth larvae | | | |
| | | | 0 | 1 | 2 | 3 | 4 | 0 | 1 | 2 | 3 | 4[1] | 0 | 1 | 2 | 3 |
| | | | Percent mortality after 3 days of exposure | | | | | | | | | | | | | |
| 50% WP | 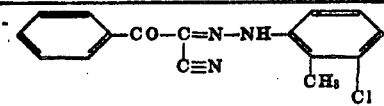 | ½ | 75 | 13 | 78 | 22 | — | 80 | 95 | 85 | 80 | 100 | — | — | — | — |
| | | 1 | 88 | 63 | 78 | 23 | — | 100 | 100 | 100 | 95 | 100 | 89 | 100 | 100 | 90 |

TABLE VIII—Continued

Foliar residual activity of experimental insecticides and standards on cotton plants aged in the greenhouse and bioassayed with various insects

| Formulation | Structure | Rate, pounds per acre | Age of residue on plants in weeks |||||||||||||||
|---|---|---|---|---|---|---|---|---|---|---|---|---|---|---|---|---|
| | | | Tobacco budworm ||||| Southern armyworm ||||| Gypsy moth larvae ||||
| | | | 0 | 1 | 2 | 3 | 4 | 0 | 1 | 2 | 3 | 4[1] | 0 | 1 | 2 | 3 |
| | | | Percent mortality after 3 days of exposure |||||||||||||||
| 50% WP | ⟨⟩—CO—C(C≡N)=N—NH—⟨⟩—Cl (2,6-diCl) | ½ | 12 | 25 | 55 | 0 | — | 75 | 80 | 75 | 20 | 25 | — | — | — | — |
| | | 1 | 100 | 50 | 80 | 0 | — | 100 | 80 | 80 | 90 | 55 | 45 | 75 | 10 | 0 |
| 50% WP | ⟨⟩—CO—C(C≡N)=N—NH—⟨⟩—Cl (3,4-diCl) | ½ | 60 | 62 | 53 | 44 | 80 | 100 | 100 | 95 | 80 | 85 | — | — | — | — |
| | | 1 | 100 | 100 | 89 | 67 | 90 | 100 | 100 | 100 | 100 | 95 | 78 | 100 | 100 | 60 |
| 50% WP | ⟨⟩—CO—C(C≡N)=N—NH—⟨⟩—Cl (3,4-diCl) | ½ | 100 | 100 | 67 | 20 | — | 100 | 100 | 80 | 100 | 100 | — | — | — | — |
| | | 1 | 100 | 100 | 100 | 83 | 70 | 100 | 100 | 100 | 95 | 100 | 100 | 100 | 100 | 90 |
| 50% WP | ⟨⟩—CO—C(C≡N)=N—NH—⟨⟩—Cl | ½ | 100 | 89 | 80 | 11 | — | 100 | 100 | 100 | 100 | 100 | — | — | — | — |
| | | 1 | 100 | 75 | 100 | 44 | 70 | 100 | 100 | 100 | 100 | 100 | — | — | — | — |

[1] Southern armyworms small—used second instar, not third.

EXAMPLE 44

Field Evaluation of Test Compounds

Test materials were applied at the rate of 1 pound actual ingredient in 57 gallons of water per acre. Application was made by a $CO_2$ power-pack sprayer with three flat-tip spray nozzles at a pressure of 25 p.s.i. and at a tractor speed of 4 miles per hour. The foliage of 60-foot rows of potatoes were treated on schedule for control of Colorado Potato Beetle (*Leptinotarsa decemlineata*). The data obtained for the test compound and untreated control are set forth in Table IX below.

EXAMPLE 45

The effectiveness of the phenylhdrazone in the control of imported cabbage worm (*Pieris rapae*) on 31-foot rows of cabbage was determined using the application procedure of Example 44. The results obtained are set forth in Table X below.

TABLE X

| Structure | Formulation | No. of worms per head of cabbage | Treatment schedule |
|---|---|---|---|
| ⟨⟩—CO—C(C=N)=N—NH—⟨⟩—Cl | 50% WP | 1.0 | 4 applications, 7-day schedule. |
| Control | | 4.7 | |

EXAMPLE 46

Effectiveness of test compounds against insects of the order Coleoptera is shown in the following test.

The test procedure employed to determine the effi-

TABLE IX

| Structure | Formulation | Percent damage to potato plants | Total yield, lbs./row |
|---|---|---|---|
| ⟨⟩—CO—C(C=N)=N—NH—⟨⟩—Cl | 50% WP | 0 | 70¼ |
| Control | | 77 | 2 | cacy of compounds of the present invention for controlling insects of the order Coleoptera is the same as that described above for the Southern Armyworm which are of the order Lepidoptera, excepting that cucumber beetles and Mexican bean beetles are substituted for southern armyworms.

Data obtained are reported in Table XI below.

TABLE XI

Use of several phenylhydrazones against adult spotted cucumber beetle (*Diabrotica undecimpunctata howardi*) and adult Mexican bean beetle (*Epilachna varivestis*)

| Structure | Concentration in p.p.m. | Adult spotted cucumber beetles [1] | Adult Mexican bean beetle [2] |
|---|---|---|---|
| (phenyl)—CO—C(C≡N)=N—NH—(phenyl-Cl, Cl) | 1,000 | 80 | 100 |
| (phenyl)—CO—C(C≡N)=N—NH—(phenyl-Cl, Cl) | 1,000 | 80 | 50 |
| (phenyl)—CO—C(C≡N)=N—NH—(phenyl-CH₃, Cl) | 1,000 | 80 | 50 |
| Cl-(phenyl)—CO—C(C≡N)=N—NH—(phenyl)-Cl | 1,000 | 30 | 20 |

[1] 2-day mortality data. [2] 4-day mortality data.

EXAMPLE 47

Procedure for small scale field trials for compounds of the present invention on corn is as follows. The experimental materials were applied at the rate of 1 lb. actual ingredient in 65 gallons of water per acre. Application was made by a portable compression sprayer at the speed of normal walking. Six feet by 14 feet plots replicated three times were treated three times on a weekly schedule. Ten corn plants per plot were examined for fall armyworms (*Spodoptera frugiperda*). The results obtained are set forth in Table XII below.

TABLE XII

Use of phenylhydrazones in foliar treatment in field control of the fall armyworm (*Spodoptera frugiperda*) on corn

| Structure | Formulation | Rate, pounds actual ingredient per acre | Total worms in three replicates |
|---|---|---|---|
| (phenyl)—CO—C(C≡N)=N—NH—(phenyl)-Cl | 50% WP | 1 | 76 |
| (phenyl)—CO—C(C≡N)=N—NH—(phenyl-Cl, Cl) | 50% WP | 1 | 19 |
| Cl-(phenyl)—CO—C(C≡N)=N—NH—(phenyl)-Cl | 50% WP | 1 | 26 |
| Control | | | 88 |

We claim:

1. A hydrocinnamonitrile compound having the formula:

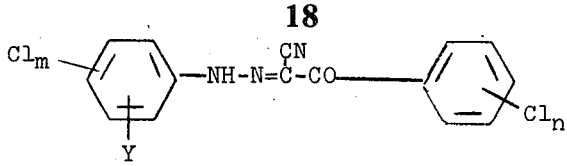

where

Y is hydrogen, chloro or lower alkyl ($C_1$–$C_4$);

$m$ is 1 or 2; and $n$ is 0, 1 or 2.

2. The compound of claim 1, $\alpha,\beta$-dioxo-, $\alpha$-[(3-chloro-o-tolyl)hydrazone]hydrocinnamonitrile.

3. The compound of claim 1, $\alpha,\beta$-dioxo-$\alpha$-[(3,4-dichlorophenyl)hydrazone]hydrocinnamonitrile.

4. The compound of claim 1, p-chloro-$\alpha,\beta$-dioxo-,$\alpha$-[(p-chlorophenyl)hydrazone]hydrocinnamonitrile.

5. The compound of claim 1, p-chloro-$\alpha,\beta$-dioxo-$\alpha$-[phenylhydrazone]hydrocinnamonitrile.

* * * * *